United States Patent Office 3,833,555
Patented Sept. 3, 1974

3,833,555
POLYSACCHARIDE CYCLIC CARBAMATE
CONTAINING COMPOUNDS
Melvin H. Keys, Sylvania, and Frank E. Semersky,
Oregon, Ohio, assignors to Owens-Illinois, Inc.
No Drawing. Filed Oct. 11, 1972, Ser. No. 296,634
Int. Cl. C07c 3/00
U.S. Cl. 260—209 R     6 Claims

ABSTRACT OF THE DISCLOSURE

New compositions of matter comprising modified polysaccharides such as agarose, dextran, cellulose, carragheenan and starch in which a minor portion of the hydroxyl groups are substituted by an N-(2,5-dioxo-4-oxazolidinyl)-alkyl carbamate or N - (2,5 - dioxo-4-oxazolidinyl)-aralkyl carbamate radical are disclosed which are useful for insolubilizing enzymes.

BACKGROUND OF THE INVENTION

An enzyme is defined as a biological catalyst capable of initiating, promoting and governing a chemical reaction without being consumed in the process or becoming part of the product formed. All enzymes are proteins and as such are sensitive to high temperatures, changes in pH, microbial attack and hydrolysis. Enzymes are synthesized by plants, animals and microorganisms and can be isolated from such diverse sources as figs, pineapples, and hog pancreas as well as microbial cells such as Aspergillus oryzae.

Enzymes have been used since prebiblical times to make bread, cheese and wine. More progress has been made in enzyme production and application in the past 100 years than in the previous 5,000 years. About $30 million worth of enzymes were marketed in the United States alone in 1964 and this figure is steadily increasing since enzymes can be used to produce not only food and beverages but pharmaceuticals, adhesives, paper and textiles.

Only a small percentage of animal and plant tissue is composed of enzymes which makes extraction procedures very costly. Furthermore, most enzymes are water soluble so that when used as catalysts they are difficult to remove from the finished product and cannot be reused. As a result, much effort has been expended in recent years to immobilize enzymes so that they can be used in continuous flow reactions or readily separated from the finished product in batch reactions and reused.

There are three principal methods for binding enzymes to matrixes such as cross-linked dextran gels, agarose, acrylic polymers, polyamino acids, cellulose or glass. These include covalent chemical binding, adsorption and entrapment of the enzyme within a gel latice. A less common method involves converting the enzyme itself into an insoluble matrix by using bifunctional compounds to cross-link the enzyme into a large aggregate.

Dextran is a polysaccharide of high molecular weight containing about 90% alpha - 1,6 - glucosidic bonds and about 10% alpha-1,3-glucosidic bonds. When such native dextran is copolymerized with epichlorohydrin as described in U.S. Pat. 3,042,667, there is obtained a cross-linked dextran gel which is water insoluble but capable of absorbing water with swelling in such a manner that the water regain of said gel is about 1 to 50 grams per gram of dry gel product. Such gels are produced by Aktiebolaget Pharmacia of Uppsala, Sweden and sold under the trade name of Sephadex in various molecular weight ranges and sieve sizes.

Agarose is a linear polysaccharide composed of alternating residues of beta-dextro-galactopyranose and 3,6-anhydro-alpha-laevo-galactopyranose. In U.S. Pat. 3,507,- 851, the diethylaminoethyl and carboxymethyl derivatives of agarose are disclosed which are endowed with ion-exchanging properties wherein U.S. Pat. 3,625,939 discloses phosphate derivatives thereof. However, no derivative of the type herein disclosed is shown in the prior art which would be useful in rendering enzymes water insoluble.

SUMMARY OF THE INVENTION

The present invention is concerned with novel compositions of matter which can be represented by the formulas

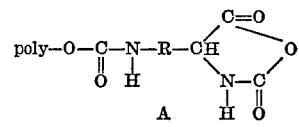

or

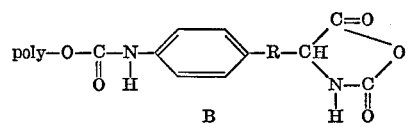

wherein poly is a polysaccharide such as dextran, agarose, carragheenan, cellulose, cotton or starch and R is an alkylene radical containing from 1 to 8 carbon atoms in which less than 50% of the hydroxyl groups in the polysaccharide molecule are replaced by the radicals.

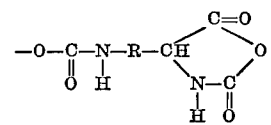

or

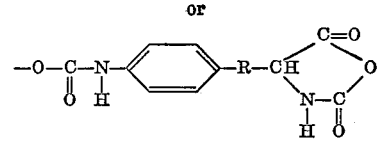

These compositions are useful in that various water soluble enzymes such as chymotrypsin, ribonuclease, urease, peroxidase and the like can be reacted with the same to produce enzyme products which are water insoluble and can be used repeatedly as catalysts in various reactions with minimal loss of enzymatic activity.

The compounds within the scope of this invention can be prepared by suspending the polysaccharide in water and treating said suspension with cyanogen bromide in the presence of an alkali metal hydroxide at room temperature. The activated polysaccharide is then condensed with an aminoacid of the formula

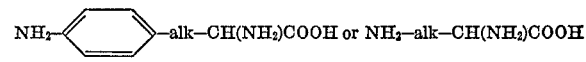

wherein alk is an alkylene radical containing from 1 to 8 carbon atoms at a temperature of about 0° C. and the condensation product thus formed is reacted with phosgene at about 35° C. to affect cyclization.

DESCRIPTION OF THE PREFERRED EMBODIMENTS

The following examples illustrate the preparation of the new compounds and their use in rendering enzymes water insoluble.

Example 1

In formula A poly is agarose and R is tetramethylene. To one gram of agarose in 10 ml. of water was added one gram of cyanogen bromide and sufficient 2.0 molar sodium hydroxide to maintain the pH at 10.5 at 25° C. The solid which formed was removed by filtration and washed with 500 ml. of cold water. The activated agarose was then added to 10 ml. of 0.1 molar sodium borate buffer containing two grams of lysine at a temperature of 0°–5° C. The condensation product thus formed was washed with water, then three grams of solid product was mixed with 75 ml. of dioxane and phosgene bubbled through the reaction mixture for 5 hours at 35°–40° C. followed by purging with dry nitrogen for 3 hours at 25° C. The off-white, cyclized, solid agarose product was separated by filtration and dried.

The condensation product composed of agarose and lysine but before cyclization with phosgene was quantitatively analysed for aminoacid side chains by adding one gram of said product to 3 ml. of distilled water and mixing with 0.5 ml. of 0.1 molar $CuCl_2$. After stirring for 30 minutes, the mixture was centrifuged and 1 ml. of the supernatant was mixed with 3 ml. of 0.05 molar ethylenediaminetetraacetic acid. The optical absorbance of the resulting solution was measured at 740 nanometers and the concentration determined from a calibration curve. If no cupric ions are detected, another aliquot of $CuCl_2$ solution is added as described above and the absorbance is again measured. The difference between the moles of $CuCl_2$ added to the condensation product and the moles of $CuCl_2$ present in the supernatant solution is equal to the number of moles of cupric ion complexed with the aminoacid side chains in said product. The extent of lysine substitution was found to be 0.32 millimoles per gram of condensation product.

Example 2

A solution containing 0.5 milligrams of ribonuclease in 4.4 ml. of water was saturated with 1.32 grams of $KHCO_3$ and cooled to 0° C. To this solution was added with stirring 50 milligrams of the cyclized, agarose product prepared in Example 1. Thereafter, stirring was continued at 0° C. for 3 hours. In this manner, the ribonuclease was rendered water insoluble and after washing with water, it was stored at 3° C. This sample was assayed by packing in a chromatographic column and measuring the rate of change of cytidine-2',3'-cyclic phosphate to cytidine monophosphate by the method of Hammes and Walz as described in Biochim. Biophys. Acta, *198*, 604 (1970). The activity indicated an equivalent of 1.1 milligrams of ribonuclease insolubilized per gram of cyclized agarose product.

Example 3

Ten milligrams of chymotrypsin and 50 milligrams of the cyclized agarose product prepared in Example 1 were added simultaneously to a saturated, aqueous solution prepared by the addition of 3 grams of $KHCO_3$ in 10 milliliters of water. The resulting mixture was cooled to 0° C. and stirred for 3 hours. The solid, water insoluble, chymotrypsin product was washed with water and the activity measured by the method described by Hummel, Can. J. Biochem. Physiol., *37*, 1393 (1959) using benzoyl tyrosine ethyl ester as a substrate. It was determined by the activity that the equivalent of 0.4 milligrams of chymotrypsin was present per gram of cyclized agarose product and that no loss in enzyme activity occurred after storing one month at 5° C.

Example 4

A solution of 20 milligrams of urease in 5 ml. of water saturated with $KHCO_3$ was cooled to 0° C. and 150 milligrams of the cyclized, agarose product prepared in Example 1 was added thereto. The mixture was stirred for 15 hours and thereafter the water insoluble, solid urease product formed was washed repeatedly with water before assaying. The assay was accomplished using a Beckman monovalent cation to measure the release of ammonium ions in an aqueous urea solution. The activity was found to be equivalent to 0.2 milligrams of urease per gram of cyclized agarose product.

Example 5

In formula B, poly is dextran and R is methylene.

One gram of Sephadex G–200 (a dextran gel crosslinked with 6% epichlorohydrin and having a water regain of 20 grams per gram of dry gel) was swelled in water to a volume of 42 ml. and 4 grams of CNBr in 40 ml. of 0.1 N sodium hydroxide was added thereto with stirring. After 18 minutes, the activated dextran was filtered and washed with water, then added to 40 ml. of 0.1 molar sodium borate buffer containing one gram of p-aminophenylalanine. Stirring was continued overnight at 3° C. after which time the condensation product formed was washed repeatedly with water and then analyzed for aminoacid side chains as described in Example 1. It was found that 0.60 millimole of p-amino-phenylalanine was substituted for each gram of condensation product.

Three grams of the condensation product thus prepared was mixed with 100 ml. of dioxane and phosgene was bubbled through the reaction mixture for 5 hours at 35° C. The solid, cyclized, dextran product was separated by filtration and dried at room temperature.

Example 6

The enzyme uricase was rendered water insoluble by adding 3 grams of $NaHCO_3$ to 10 ml. of aqueous uricase solution containing 10 international units of activity and reacting the same with 100 milligrams of the cyclized, dextran product prepared in Example 5 at 0° C. overnight. The solid thus formed was assayed by conventional methods and the initial activity was equivalent to 0.065 milligrams of uricase per gram of cyclized, dextran product which was reduced 50% one month later after wet storage at 3° C.

Example 7

Thirty milligrams of urease (containing 46 international units per milligram) and 1.5 grams of sodium bicarbonate in 5 ml. of water were reacted with 100 milligrams of the cyclized, dextron product prepared in Example 5 at 0° C. overnight. The solid which resulted was washed exhaustively with 0.02 molar borate buffer and then with 0.01 molar phosphate buffer. The washed solid when assayed had an initial activity equivalent to 0.27 milligrams of urease per gram of cyclized, dextran product which remained unchanged after one month of frequent use.

In like manner, other aminoacids of the formula $NH_2$-alk-CH($NH_2$)COOH in which alk is alkylene containing from 1 to 8 carbon atoms can be substituted for lysine in the procedure of Example 1 to obtain other compounds corresponding to formula A all of which are envisioned to be encompassed by the present invention and useful for insolubilizing various types of enzymes such as papain, xanthine oxidase and glutamicpyruvic transaminase. If desired, cellulose or starch can be used as the polysaccharide in lieu of agarose or dextran.

Likewise, as will be apparent to those skilled in the art, aminoacids of the formula

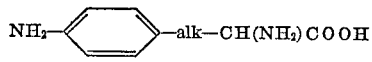

in which alk is alkylene with from 1 to 8 carbon atoms may be substituted for the p-aminophenylalanine of Example 5 to obtain other compounds corresponding to formula B.

We claim:
1. Polysaccharides of the formulas

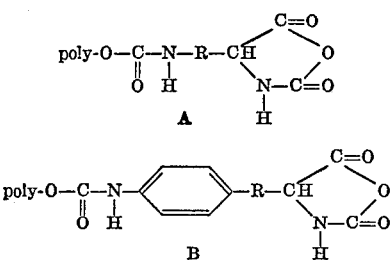

wherein poly is a polysaccharide selected from the group consisting of agarose, carragheenan, dextran, cellulose and starch and R is alkylene containing from 1 to 8 carbon atoms in which a minor portion of the hydroxyl groups in the polysaccharide are replaced by an N-(2,5-dioxo-4-oxazolidinyl) - alkyl carbamate or N-(2,5-dioxo-4-oxazolidinyl)-aralkyl carbamate.

2. A is a polysaccharide as in Formula A of Claim 1 in which R is tetramethylene and poly is agarose.

3. A is a polysaccharide as in formula B of Claim 1 in which R is methylene and poly is dextran.

4. A method of preparing a modified polysaccharide as in Claim 1 which consists of activating a polysaccharide selected from the group consisting of agarose, dextran, carragheenan, cellulose or starch by treatment with cyanogen bromide in the presence of an alkali metal hydroxide, condensing said activated polysaccharide with a compound selected from the group consisting of aminoacids of the formulas

wherein alk is alkylene of from 1 to 8 carbon atoms at a temperature of about 0° C. and reacting said condensation product with phosgene at about 35° C. to affect cyclization.

5. A method as in Claim 4 in which the polysaccharide is agarose and the aminoacid is lysine.

6. A method as in Claim 4 in which the polysaccharide is dextran which after activation with cyanogen bromide is condensed with p-aminophenylalanine and thereafter cyclized with phosgene.

References Cited
UNITED STATES PATENTS 2,562,978   8/1951   Wolff _____ 260—209 R
3,507,851   4/1970   Ghetie et al. _____ 260—209 R JOHNNIE R. BROWN, Primary Examiner U.S. Cl. X.R.

195—72; 260—212, 209 D, 233.3 R, 234 D, 234 R